(12) United States Patent
Utagawa et al.

(10) Patent No.: US 7,715,703 B2
(45) Date of Patent: May 11, 2010

(54) IMAGE SENSOR AND IMAGE CAPTURING DEVICE

(75) Inventors: Ken Utagawa, Yokohama (JP); Yosuke Kusaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 576 days.

(21) Appl. No.: 11/645,663

(22) Filed: Dec. 27, 2006

(65) Prior Publication Data

US 2007/0154200 A1 Jul. 5, 2007

(30) Foreign Application Priority Data

Jan. 5, 2006 (JP) .............................. 2006-000701

(51) Int. Cl.
*G03B 7/28* (2006.01)

(52) U.S. Cl. .......................... 396/111; 396/79; 396/50; 396/115; 396/124; 348/345; 348/349; 348/350

(58) Field of Classification Search ................... 396/79, 396/80, 111, 114, 115, 121, 124; 348/345, 348/349, 350; 345/207
See application file for complete search history.

(56) References Cited

U.S. PATENT DOCUMENTS

| 5,324,930 | A | * | 6/1994 | Jech, Jr. .......................... 250/216 |
| 6,831,692 | B1 | * | 12/2004 | Oda ............................ 348/315 |
| 2004/0125230 | A1 | * | 7/2004 | Suda ........................... 348/345 |
| 2004/0246369 | A1 | * | 12/2004 | Yamazaki .................... 348/374 |
| 2005/0226609 | A1 | * | 10/2005 | Suda ........................... 396/114 |
| 2005/0275650 | A1 | * | 12/2005 | Dosluoglu ................... 345/207 |
| 2006/0092313 | A1 | * | 5/2006 | Kimura ....................... 348/345 |
| 2006/0170794 | A1 | * | 8/2006 | Higuchi et al. .............. 348/241 |
| 2007/0102619 | A1 | * | 5/2007 | Kusaka ..................... 250/201.2 |

FOREIGN PATENT DOCUMENTS

| JP | A 4-267211 | 9/1992 |
| JP | A 2003-244712 | 8/2003 |

\* cited by examiner

*Primary Examiner*—Warren B. Perkey
*Assistant Examiner*—Warren K Fenwick
(74) *Attorney, Agent, or Firm*—Oliff & Berridge, PLC

(57) ABSTRACT

An image sensor includes: image capturing pixels and focus detection pixels disposed together on a single substrate; and adjacent pixels that are not equipped with a photoelectric conversion unit and are disposed adjacent to the focus detection pixels.

12 Claims, 13 Drawing Sheets

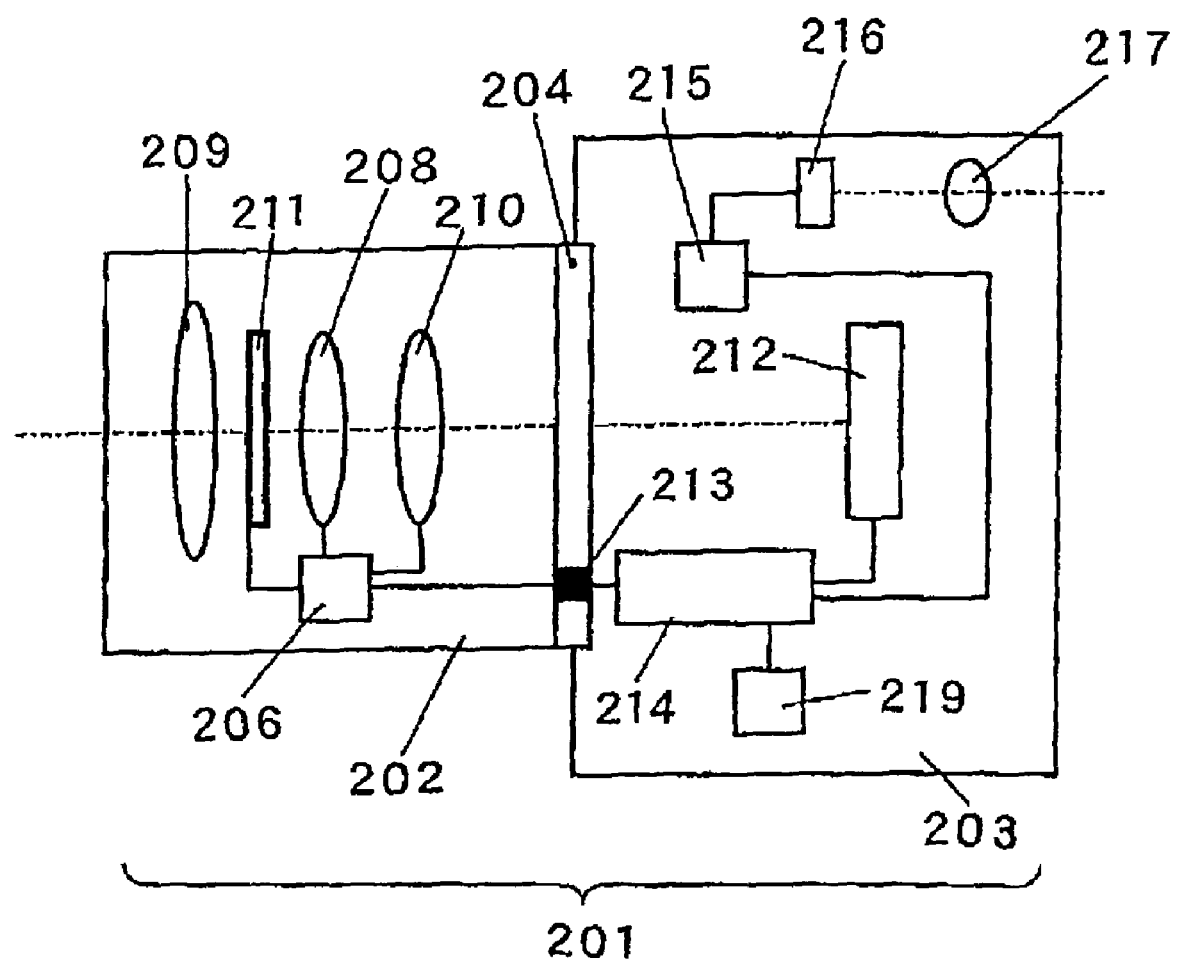

IMAGE SENSOR AND IMAGE CAPTURING DEVICE

INCORPORATION BY REFERENCE

The disclosure of the following priority application is herein incorporated by reference:
Japanese Patent Application No. 2006-000701 filed Jan. 5, 2006

BACKGROUND OF THE INVENTION

1. Field of the Invention

The present invention relates to an image sensor that includes both image capturing pixels and focus detection pixels arrayed on a single substrate, a device that captures an image and detects the focusing state of a photographic lens by utilizing this image sensor, and a camera equipped with the image sensor.

2. Description of Related Art

There are devices known in the related art that capture an image and also detect the focusing state of a photographic lens by using an image sensor comprising image capturing pixels and focus detection pixels arrayed together on a single substrate (see, for instance, Japanese Laid Open Patent Publication No. 2003-244712)

SUMMARY OF THE INVENTION

However, such a device in the related art described above, achieved by two-dimensionally arraying image capturing pixels each equipped with a single photoelectric conversion unit and focus detection pixels each equipped with a pair of photoelectric conversion units without gaps between them, requires read circuits with different structures in conjunction with the image capturing pixels and the focus detection pixels, which is bound to result in a more complex circuit structure. In addition, since the read control for the image capturing pixels and the read control for the focus detection pixels need to be executed differently, the overall read control is also bound to be complex. Furthermore, since the image capturing pixels and the focus detection pixels are equal in size and thus the read circuits for the greater number of photoelectric conversion units at the focus detection pixels needs to be disposed in the same amount of space as that for the image capturing pixels, the design rules do not allow the pixels to be miniaturized to a significant extent.

According to the 1st aspect of the invention, an image sensor comprises: image capturing pixels and focus detection pixels disposed together on a single substrate; and adjacent pixels that are not equipped with a photoelectric conversion unit and are disposed adjacent to the focus detection pixels.

According to the 2nd aspect of the invention, in the image sensor according to the 1st aspect, it is preferred that there is further provided read circuits that read out photoelectric conversion outputs of the focus detection pixels that are disposed at the adjacent pixels.

According to the 3rd aspect of the invention, in the image sensor according to the 1st aspect, it is preferred that the image capturing pixels and the focus detection pixels assume sizes equal to each other.

According to the 4th aspect of the invention, in the image sensor according to the 1st aspect, it is preferred that: each of the image capturing pixels includes a single photoelectric conversion unit; each of the focus detection pixels includes a pair of photoelectric conversion units, and a micro-lens through which incident light is condensed onto the photoelectric conversion unit(s) is disposed at each of the image capturing pixels and the focus detection pixels According to the 5th aspect of the invention, in the image sensor according to the 1st aspect, it is preferred that: the image capturing pixels are arrayed two-dimensionally; and the focus detection pixels are arrayed in a line.

According to the 6th aspect of the invention, in the image sensor according to the 5th aspect, it is preferred that the focus detection pixels and the adjacent pixels are arrayed in a line.

According to the 7th aspect of the invention, in the image sensor according to the 6th aspect, it is preferred that there is further provided an optical low pass filter disposed so as to project image light fluxes in double along a direction in which the focus detection pixels and the adjacent pixels are arrayed.

According to the 8th aspect of the invention, in the image sensor according to the 1st aspect, it is preferred that: there is further provided color filters that are disposed at the pixels so as to achieve a specific color array; and the focus detection pixels are disposed at positions corresponding to color filters set with a highest density in the specific color array.

According to the 9th aspect of the invention, in the image sensor according to the 1st aspect, it is preferred that the focus detection pixels each include a regulating member for regulating an area over which light is received at a photoelectric conversion unit thereof and an opening at the regulating member assumes a same shape as a shape of a light receiving area at a photoelectric conversion unit in each of the image capturing pixels.

According to the 10th aspect of the invention, in the image sensor according to the 1st aspect, it is preferred that the focus detection pixels each include a regulating member for regulating an area over which light is received at a photoelectric conversion unit thereof and an opening at the regulating member assumes a circular shape with an area smaller than a light receiving area at a photoelectric conversion unit in each of the image capturing pixels.

According to the 11th aspect of the invention, an image capturing device comprises: an image sensor according to the 1; an optical system that forms an image on the image sensor; an image capturing unit that generates an image based upon outputs from the image capturing pixels in the image sensor; and a focus detection unit that detects a state of focus adjustment achieved with the optical system based upon outputs from the focus detection pixels in the image sensor.

According to the 12th aspect of the invention, in the image capturing device according to the 11th aspect, it is preferred that: color filters corresponding to a specific color are disposed at the focus detection pixels in the image sensor; and the image capturing unit combines outputs from a plurality of photoelectric conversion units at each focus detection pixel and uses the combined output as a substitute for an output from an image capturing pixel.

According to the 13th aspect of the invention, an image capturing device comprises: an image sensor that includes two-dimensionally arrayed image capturing pixels each equipped with a color filter and a photoelectric conversion unit, and focus detection pixels, each equipped with a color filter corresponding to a specific color and a pair of photoelectric conversion units that are disposed in part of an array of the image capturing pixels; an optical system that forms an image on the image sensor; a combining unit that combines outputs of the pair of photoelectric conversion units at each focus detection pixel; a correction unit that corrects an output from the combining unit so that an output level of the output from the combining unit is equalized to an output level of a hypothetical image capturing pixel with a color filter corresponding to the specific color hypothetically occupying a position actually assumed by the focus detection pixel; an image capturing unit that generates an image based upon outputs from the image capturing pixels and outputs from the focus detection pixels having been corrected by the correction unit; and a focus detection unit that detects a state of focus adjustment achieved with the optical system based upon outputs from the focus detection pixels.

According to the 14th aspect of the invention, a camera comprises an image sensor according to the 1st aspect.

According to the 15th aspect of the invention, an image capturing method comprises: disposing image capturing pixels and focus detection pixels together on a single substrate; disposing adjacent pixels equipped with no photoelectric conversion unit at positions adjacent to the focus detection pixels; and photoelectrically converting a light flux entering each of the image capturing pixels and the focus detection pixels.

According to the 16th aspect of the invention, in the image capturing method according to the 15th aspect, it is preferred that: read circuits that read out photoelectric conversion outputs from the focus detection pixels are disposed at the adjacent pixels; and the photoelectric conversion outputs from the focus detection pixels are read out via the read circuits.

According to the 17th aspect of the invention, in the image capturing method according to the 15th aspect, it is preferred that a plurality of photoelectric conversion units are disposed at each of the focus detection pixels.

According to the 18th aspect of the invention, in the image capturing method according to the 17th aspect, it is preferred that the plurality of photoelectric conversion units execute photoelectric conversion independently of one another to photoelectrically convert light fluxes entering therein via a single micro-lens disposed in close proximity to the focus detection pixel.

According to the 19th aspect of the invention, in the image capturing method according to the 16th aspect, it is preferred that: a plurality of photoelectric conversion units are disposed at each of the focus detection pixels; and photoelectric conversion outputs from some of the plurality of photoelectric conversion units are output via the read circuits.

According to the 20th aspect of the invention, in the image capturing method according to the 15th aspect, it is preferred that a light flux entering each of the focus detection pixels is also made to enter an adjacent pixel set next to the focus detection pixel via an optical member.

According to the 21st aspect of the invention, in the image capturing method according to the 15th aspect, it is preferred that: a light flux enters each of the image capturing pixels via a color filter constituting part of a specific color array; and a light flux enters each of the focus detection pixels via a color filter corresponding to a color disposed with a highest density in the specific color array achieved with color filters.

According to the 22nd aspect of the invention, an image capturing method comprises: disposing image capturing pixels and focus detection pixels together on a single substrate; disposing adjacent pixels equipped with no photoelectric conversion unit at positions adjacent to the focus detection pixels; photoelectrically converting via an optical system individual light fluxes entering the image capturing pixels and the focus detection pixels; generating an image based upon photoelectric conversion outputs from the image capturing pixels; and detecting a state of focus adjustment achieved via the optical system based upon photoelectric conversion outputs from the focus detection pixels.

According to the 23rd aspect of the invention, in the image capturing method according to the 22nd aspect, it is preferred that: light fluxes enter the focus detection pixels via color filters corresponding to a specific color; and the image is generated based upon the outputs from the image capturing pixels and the outputs from the focus detection pixels.

According to the 24th aspect of the invention, an image sensor, comprises: first pixels that capture an image; second pixels that detect focus condition of an optical system, the first pixels and the second pixels being disposed together on a single substrate; and third pixels that are disposed adjacent to the second pixels without a photoelectric conversion unit.

According to the 25th aspect of the invention, in the image sensor according to the 24th aspect, it is preferred that: each of the first pixels comprises a first photoelectric conversion unit that converts a light from the optical system into an electric signal respectively; and each of the second pixels comprises a second photoelectric conversion unit that is different from the first photoelectric conversion unit to convert the light from the optical system.

According to the 26th aspect of the invention, an image capturing device comprises: an image sensor that includes two-dimensionally arrayed image capturing pixels each equipped with a color filter and a photoelectric conversion unit, and focus detection pixels, each equipped with a color filter corresponding to a specific color and a pair of photoelectric conversion units that are disposed in part of an array of the image capturing pixels; a combining unit that combines outputs of the pair of photoelectric conversion units at each focus detection pixel; a correction unit that corrects an output from the combining unit so that an output level of the output from the combining unit is equalized to an output level of a hypothetical image capturing pixel with a color filter corresponding to the specific color hypothetically occupying a position actually assumed by the focus detection pixel; an image capturing unit that generates an image based upon outputs from the image capturing pixels and outputs from the focus detection pixels having been corrected by the correction unit; and a focus detection unit that detects a state of focus adjustment achieved with an optical system based upon outputs from the focus detection pixels.

BRIEF DESCRIPTION OF THE DRAWINGS

FIG. 9 shows the structure of an image capturing device equipped with the image sensor in the embodiment;

DESCRIPTION OF PREFERRED EMBODIMENTS

Figure 1:
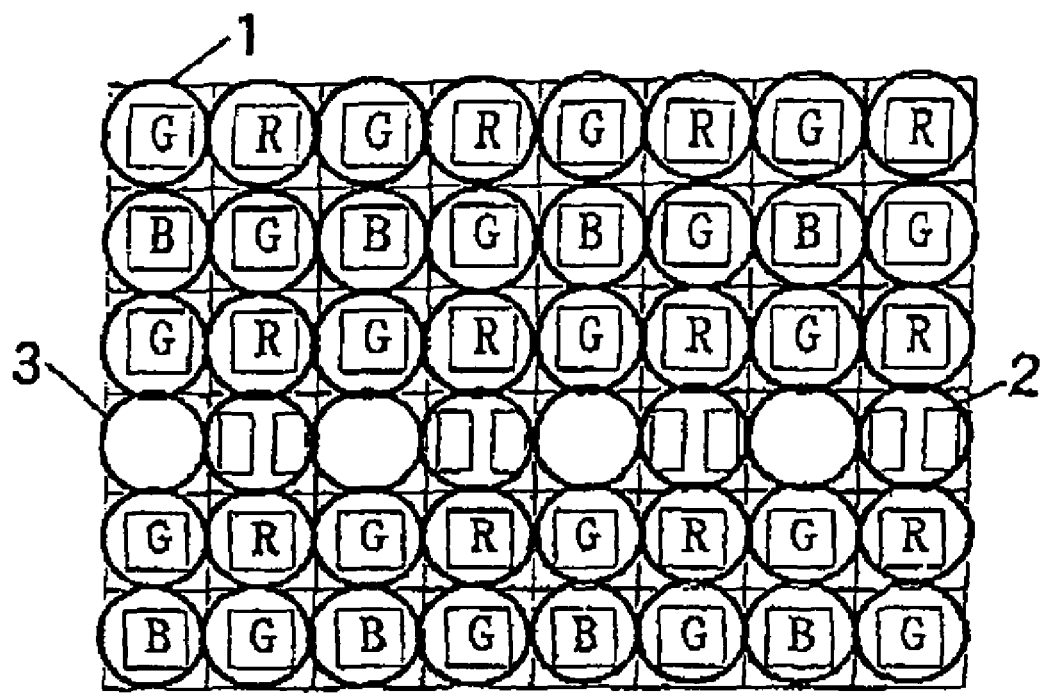
FIG. 1 shows the layout (a front view) of the image capturing pixels and the focus detection pixels adopted in the image sensor achieved in an embodiment.
Figure 2A:
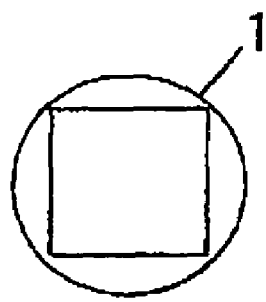
FIGS. 2A, 2B and 2C are front views of an image capturing pixel, a dummy pixel and a focus detection pixel respectively.
Figure 2B:
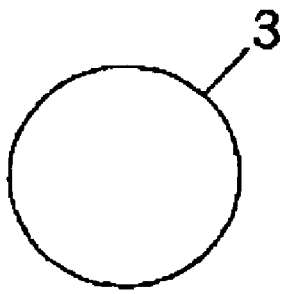
Figure 2C:
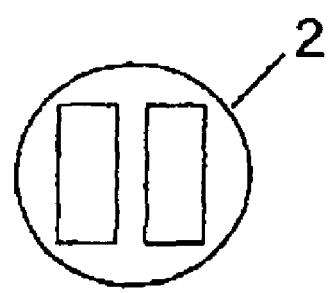

FIG. 1 shows the layout (front view) of the image capturing pixels and the focus detection pixels constituting the image sensor (image capturing element) achieved in an embodiment. FIG. 2A is a front view of an image capturing pixel, FIG. 2B is a front view of a dummy pixel and FIG. 2C is a front view of a focus detection pixel. It is to be noted that in order to facilitate the explanation, FIG. 1 shows only part of the image sensor over a range of six pixels (vertical) by eight pixels (horizontal). Image capturing pixels 1, each equipped with a single photoelectric conversion unit, are two-dimensionally arrayed on a substrate at the image sensor and focus detection pixels 2, the size of each of which is equal to that of each of the image capturing pixels 1, are arrayed one-dimensionally in a line or in a single row over part of the substrate. In the focus detection pixel row, focus detection pixels 2, each equipped with two photoelectric conversion units, are disposed at every other position, with dummy pixels 3, equipped with no photoelectric conversion units, disposed so as to be interspersed between the individual focus detection pixels 2. In addition, a read circuit (to be described in detail later) that reads out the outputs from the photoelectric conversion units at the individual pixels is formed on the substrate at the image sensor. R (red), G (green) and B (blue) in FIG. 1 indicate different types of color filters disposed at the individual image capturing pixels 1 and it is assumed that the color filters are arranged in a Bayer array in the embodiment. The focus detection pixels 2 are disposed at positions that would otherwise be assumed by G (green) image capturing pixels 1. The frames encircling the individual pixels each indicate a micro lens disposed at a given pixel.

In FIG. 2A showing an image capturing pixel 1, the circle indicates the micro lens disposed in correspondence to the particular pixel and the quadrangular frame indicates a photoelectric conversion unit. Each dummy pixel 3, disposed between a focus detection pixel 2 and the next focus detection pixel 2, includes one micro lens (indicated by the circle) but does not include a photoelectric conversion unit, as shown in FIG. 2B. It is to be noted that the dummy pixels 3 may not need to include micro lenses. As shown in FIG. 2C illustrating a focus detection pixel 2, each focus detection pixel 2 includes one micro lens (indicated by the circle) and two (a pair of) photoelectric conversion units (indicated by the quadrangular frames). It is to be noted that the pair of photoelectric conversion units in each focus detection pixels 2 are set along the direction matching the direction in which the individual focus detection pixels 2 are disposed.

Figure 3:
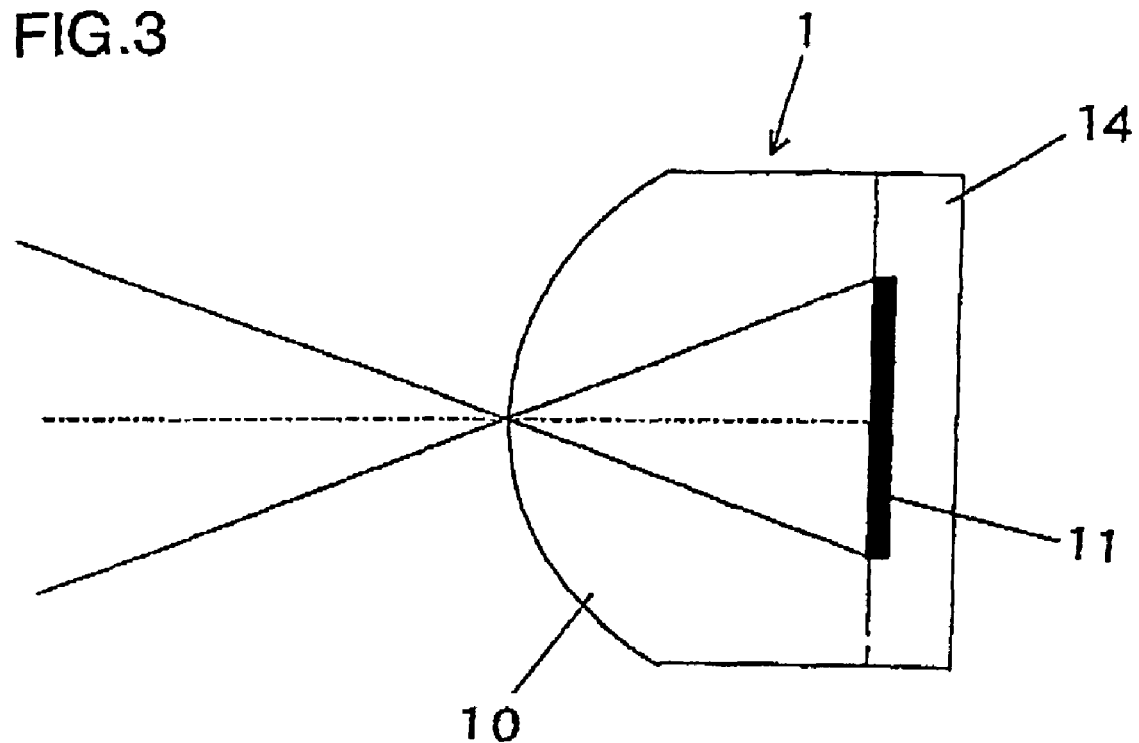
FIG. 3 is a sectional view of an image capturing pixel.

FIG. 3 is a lateral sectional view of an image capturing pixel 1. At the image capturing pixel 1, which includes a micro lens 10 disposed further frontward relative to an image capturing photoelectric conversion unit 11 formed on a substrate 14, a light beam condensed via the micro lens 10 is received at the photoelectric conversion unit 11.

Figure 4:
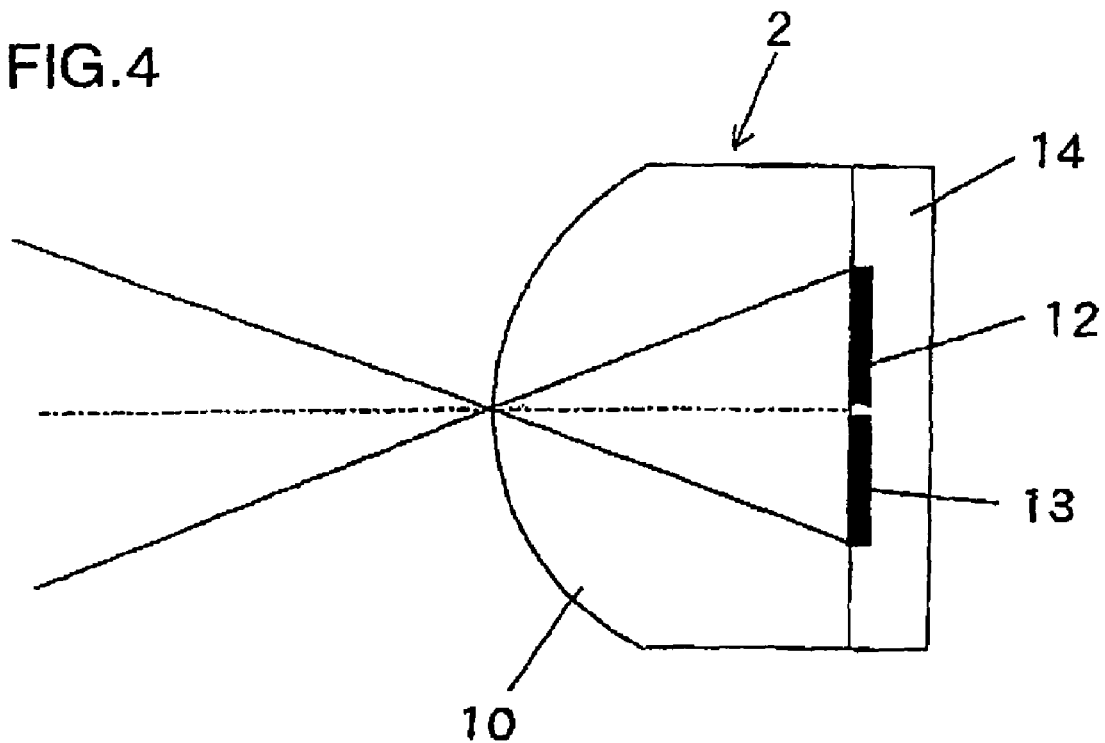
FIG. 4 is a sectional view of a focus detection pixel.

FIG. 4. is a lateral sectional view of a focus detection pixel 2. At the focus detection pixel 2, which includes a micro lens 10 disposed further frontward relative to focus detection photoelectric conversion units 12 and 13, a light beam condensed through the micro lens 10 is received at the photoelectric conversion units 12 and 13. In other words, the photoelectric conversion units 12 and 13 are projected through the micro lens 10 along the frontward direction relative to the micro lens 10.

Figure 5:
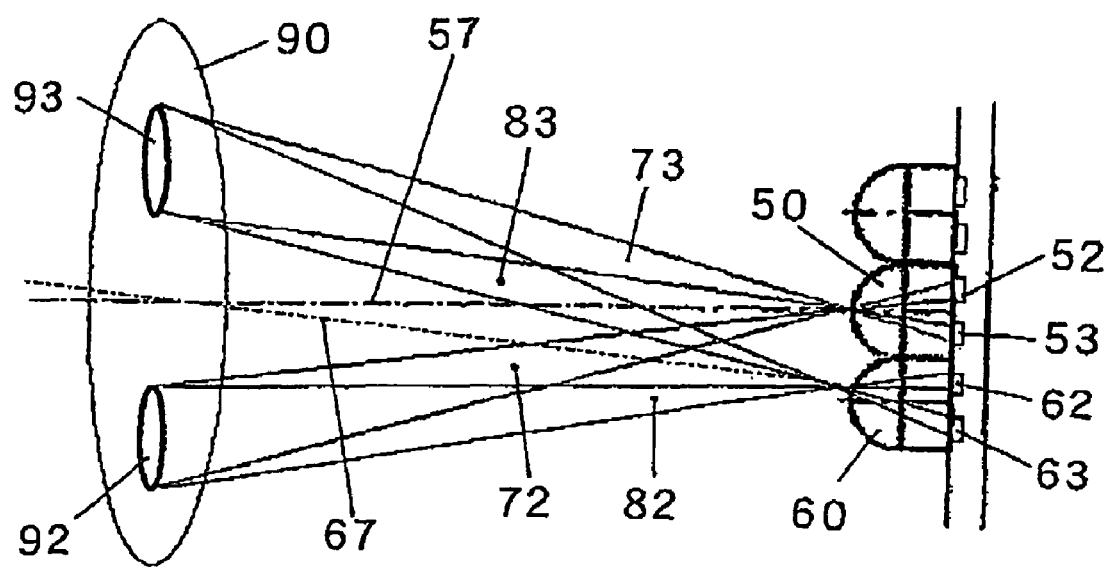
FIG. 5 illustrates the principal of the focus detection achieved by using the image sensor in the embodiment.

FIG. 5 illustrates the principal of the focus detection achieved by using the image sensor in the embodiment. The figure schematically illustrates two focus detection pixels set next to each other, i.e., a pixel that includes a micro lens 50 and a pair of photoelectric conversion units 52 and 53 and a pixel that includes a micro lens 60 and a pair of photoelectric conversion units 62 and 63. Reference 90 in the figure indicates the exit pupil of the optical system with which the focus detection is executed, whereas reference numerals 50 and 60 in the figure each indicate a micro lens. In addition, reference numerals 52 and 53 and reference numerals 62 and 63 indicate pairs of photoelectric conversion units disposed at the individual focus detection pixels. Reference numeral 57 indicates the projecting direction via the micro lens 50, whereas reference 67 indicates the projecting direction via the micro lens 60. A set of reference numerals 72 and 73 and a set of reference numerals 82 and 83 each indicate a pair of focus detection light fluxes. In addition, reference numeral 92 indicates the range (range-finding pupil) of the photoelectric conversion units 52 and 62 projected via the micro lenses 50 and 60, whereas reference numeral 93 indicates the range (range-finding pupil) of the photoelectric conversion units 53 and 63 projected via the micro lenses 50 and 60.

The micro lenses 50 and 60 are each disposed near an estimated image forming plane of the optical system. The shapes of the pair of photoelectric conversion units 52 and 53 disposed behind the micro lens 50 are projected onto the exit pupil 90 via the micro lens 50 and the projected shapes define the range-finding pupils 92 and 93. In addition, the shapes of the pair of photoelectric conversion units 62 and 63 disposed behind the micro lens 60 are projected onto the exit pupil 90 via the micro lens 60 and the projected shapes define the range-finding pupils 92 and 93. Namely, the projecting directions are determined for the micro lenses at the individual focal lens detection pixels so that the shapes of the photoelectric conversion units (the range-finding pupils 92 and 93) projected from the individual focus detection pixels, align with one another on the exit pupil 90.

The photoelectric conversion unit 52 outputs a signal corresponding to the intensity of an image formed on the micro lens 50 with the focus detection light flux 72 having passed through the range-finding pupil 92 and having advanced toward the micro lens 50. In addition, the photoelectric conversion unit 53 outputs a signal corresponding to the intensity of an image formed on the micro lens 50 with the focus detection light flux 73 having passed through the range-finding pupil 93 and having advanced toward the micro lens 50 Also, the photoelectric conversion unit 62 outputs a signal corresponding to the intensity of an image formed on the micro lens 60 with the focus detection light flux 82 having passed through the range-finding pupil 92 and having advanced toward the micro lens 60. The photoelectric conversion unit 63 outputs a signal corresponding to the intensity of an image formed on the micro lens 60 with the focus detection light flux 83 having passed through the range-finding pupil 93 and having advanced toward the micro lens 60.

By integrating the outputs from the pairs of photoelectric conversion units disposed behind numerous focus detection pixels structured as described above, which are disposed in an array, information related to the intensity distribution of a pair of images formed on the pixel row with the individual focus detection light fluxes passing through the range-finding pupil 92 and the range-finding pupil 93 is obtained. Next, image offset detection arithmetic processing (correlational processing, phase detection processing) of the known art is executed by using the information thus obtained so as to detect the extent of image offset manifested by the pair of images through the split-pupil focus detection method. The image offset extent is then multiplied by a predetermined conversion coefficient and, as a result, the extent of deviation (defocus quantity) of the current image forming plane (the image forming plane at the focus detection position corresponding to the position of the micro lens array on the estimated image forming plane) relative to the estimated image forming plane can be calculated.

Figure 6:
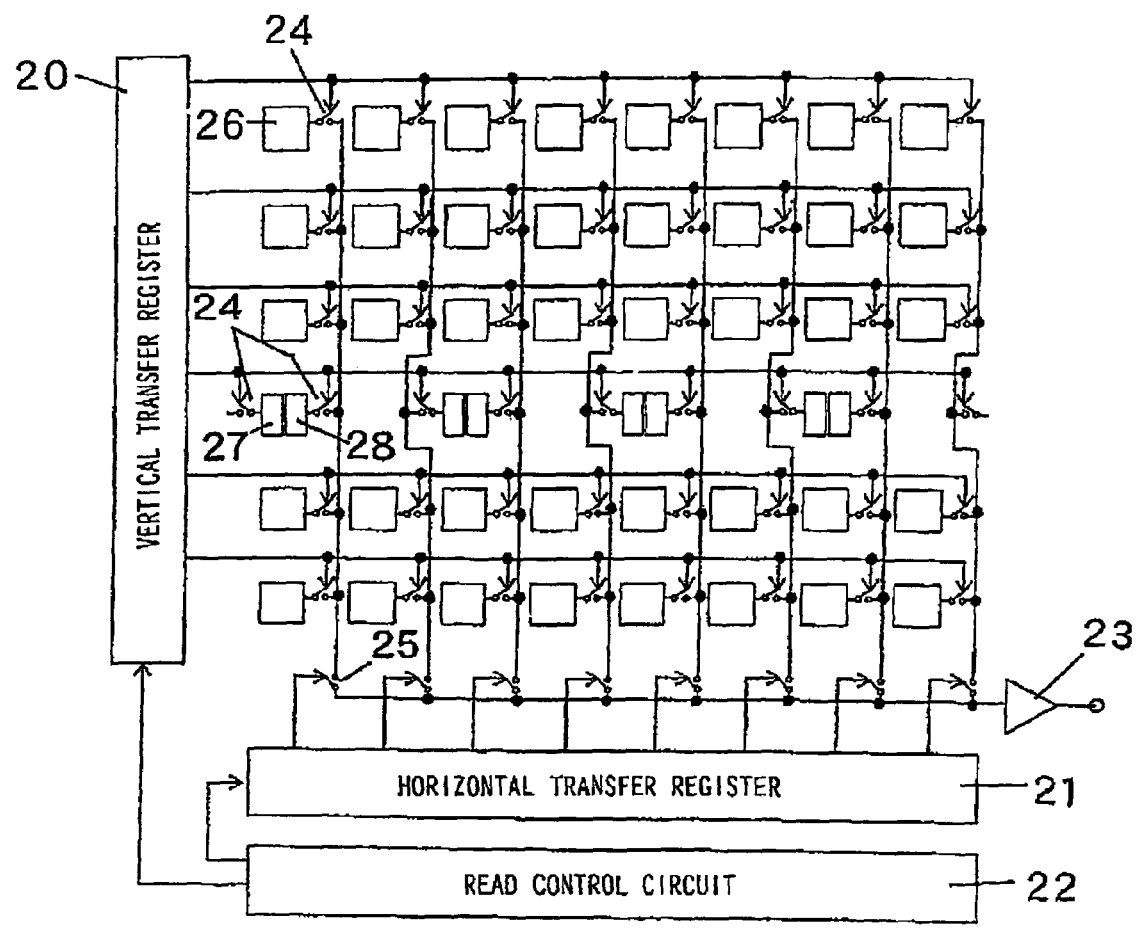
FIG. 6 presents an example in which the read circuits of the image sensor adopting the pixel layout in FIG. 1 are constituted with MOS switches.

FIG. 6 presents an example in which the read circuit at the image sensor adopting the pixel layout in FIG. 1 is constituted with MOS switches. A transfer MOS switch 24 is connected to a photoelectric conversion unit 26 at each image capturing pixel, whereas separate transfer moss switches 24 are each connected to one of a pair of photoelectric conversion units 27 and 28 at each focus detection pixel. A vertical transfer register 20 turns on/off the transfer MOS switches 24 each provided in correspondence to one of the photoelectric conversion units under control executed by a read control circuit 22 and transfers the outputs from the photoelectric conversion units to transfer MOS switches 25 in units of the individual pixel lines. A horizontal transfer register 21 sequentially turns on/off the transfer MOS switches 25 under control executed by the read control circuit 22 and sequentially transfers the outputs having been transferred via the transfer MOS switches 24 to an amplifier 23. The amplifier 23 amplifies the outputs transferred from the transfer MOS switches 25 and outputs the amplified outputs to the outside of the image sensor.

With the read circuit constituted with MOS switch elements as described above, the number of photoelectric conversion units disposed in each line and in each row on the two-dimensional array remains unchanged even when the focus detection pixels are disposed among the image capturing pixels and, as a result, read control can be executed in a manner similar to the read control executed at a standard image sensor that does not include focus detection pixels. In addition, while the focus detection pixels each need to assume a circuit structure that includes two MOS transfer switches 24, the circuits of the MOS transfer switches 24 can be formed in the space available at the adjacent dummy pixels, and thus a great advantage is achieved in the circuit space layout.

Figure 7:
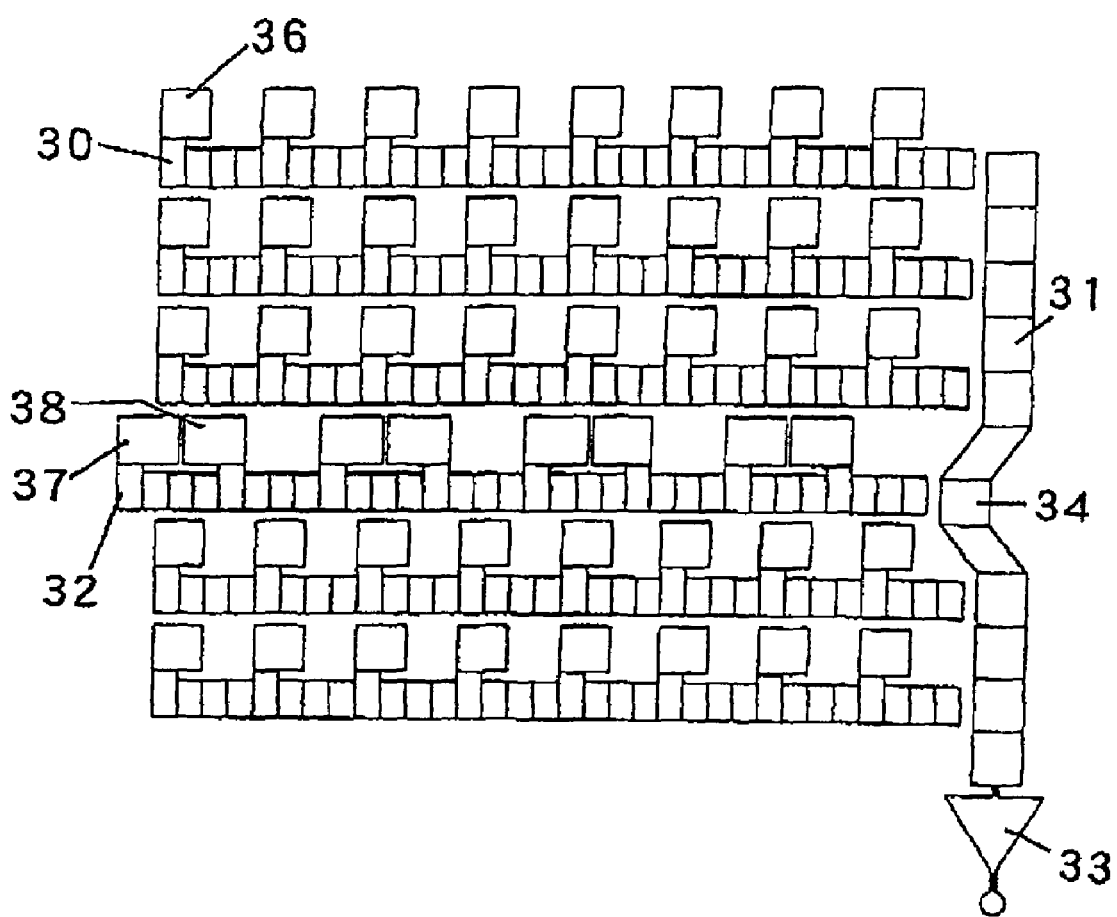
FIG. 7 presents an example in which the read circuits of the image sensor adopting the pixel layout in FIG. 1 is constituted with CCDs (charge transfer device)

FIG. 7 presents an example in which the read circuit at the image sensor adopting the pixel layout shown in FIG. 1 is constituted with CCDs (charge transfer devices). A horizontal transfer CCD register 30 is connected to a photoelectric conversion unit 36 at each image capturing pixel, whereas a horizontal transfer CCD register 32 is connected to a pair of photoelectric conversion units 37 and 38 at each focus detection pixel. The horizontal transfer CCD registers 30 transfer the outputs from the photoelectric conversion units having been transferred to the horizontal transfer CCD registers 30 all at once to a vertical transfer CCD register 31 along the horizontal direction in conformance to a transfer clock. Each time an output is transferred to the vertical transfer CCD register via the horizontal transfer CCD registers, the vertical transfer CCD register 31 transfers the output to an amplifier 33 along the vertical direction in conformance to a transfer clock. The amplifier 33 amplifies the output transferred from the vertical transfer CCD register 31 and outputs the amplified output to the outside of the image sensor.

As shown in FIG. 7, the horizontal transfer CCD register 32 provided in correspondence to the photoelectric conversion units at each focus detection pixel is disposed at a position offset along the horizontal direction relative to the position of the horizontal transfer CCD register 30, so as to match the transfer stage structure for the horizontal transfer CCD register 32 with the transfer stage structure assumed for the horizontal transfer CCD register 30 in correspondence to the positions of the photoelectric conversion units 37 and 38. With the horizontal transfer CCD register 32 disposed at an offset position along the horizontal direction as described above, a portion 34 of the vertical transfer CCD register 31 to which the outputs are transferred from the horizontal transfer CCD register 32, too, is offset along the horizontal direction.

Figure 8A:
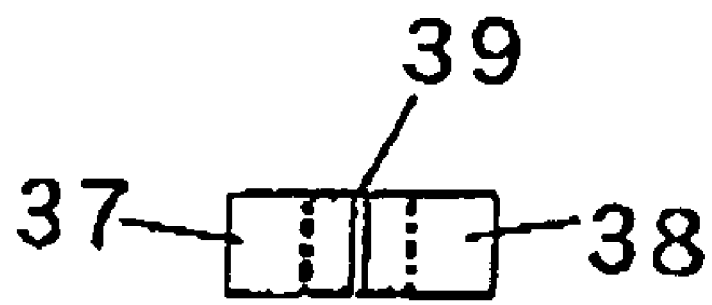
FIGS. 8A and 8B each show a light blocking member disposed at a focus detection pixel.

In order to allow the horizontal transfer CCD register 32 to assume an identical transfer stage structure to the transfer stage structure of the horizontal transfer CCD register 30, the photoelectric conversion units 37 and 38 at the focus detection pixels assume a size greater than the size of the area over which the light is condensed via the micro lenses. However, if the photoelectric conversion units 37 and 38 are unnecessarily large, stray light (light beams with which a good image cannot be formed) is allowed to enter and accordingly, a light blocking member is disposed between each pair of photoelectric conversion units 37 and 38 and the corresponding micro lens so as to prevent entry of stray light, FIG. 8A presents an example in which a light blocking member with an opening 39 (present within the dotted lines in the figure) is disposed in conjunction with the photoelectric conversion units 37 and 38, so as to match the size of the light receiving area at the photoelectric conversion units 37 and 38 with the size of the photoelectric conversion unit (light receiving portion) at the image capturing pixel.

Figure 8B:
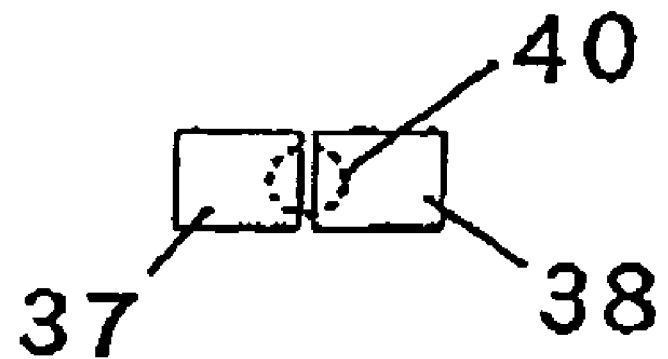

It is to be noted that an eclipse of the focus detection light fluxes at various types of photographic lenses and apertures may be prevented by disposing a light blocking member with an opening 40 (present within the dotted lines in the figure) so as to form a circular light receiving area at the photoelectric conversion units 37 and 38, which is smaller in size than the photoelectric conversion unit (light receiving portion) of the image capturing pixel, as shown in FIG. 8B.

FIG. 9 shows the structure adopted in an image capturing device (an image capturing and focus detection device) equipped with the image sensor in the embodiment described above. The image capturing device is achieved in the form of a digital still camera 201. The digital still camera 201 comprises a camera body 203 and an exchangeable lens 202 that is mounted at the camera body 203 via a mount unit 204.

The exchangeable lens 202 includes internal components such as a lens 209, a zooming lens 208, a focusing lens 210, an aperture 211 and a lens drive control circuit 206. The lens drive control circuit 206, which includes a CPU (not shown), executes drive control for the focusing lens 210 and the aperture 211, detects the conditions of the zooming lens 208, the focusing lens 210 and the aperture 211 and exchanges various types of information including aperture information through communication with a body drive control circuit 214 to be detailed later.

At the camera body 203, an image sensor 212, the body drive control circuit 214, a liquid crystal display element drive circuit 215, a liquid crystal display element 216, an eyepiece lens 217, a memory card 219 and the like are installed. The body drive control circuit 214, which includes a CPU (not shown), reads out image signals from the image sensor 212 disposed at the estimated image forming plane assumed for the exchangeable lens 202, communicates with the lens drive control circuit 206 (to receive the aperture opening information/transmit the defocus quantity), corrects the image signal based upon the aperture opening information and pixel information, detects the state of focus adjustment achieved via the exchangeable lens 202, controls the overall operation of the digital still camera and the like.

In addition, the body drive control circuit 214 controls the liquid crystal display element drive circuit 215 at a liquid crystal viewfinder (EVF: electronic viewfinder) and displays a subject image at the liquid crystal display element 216. The photographer is able to observe the subject image displayed at the liquid crystal display element 216 through the eyepiece lens 217. The captured image is stored into the memory card (image storage) 219. The body drive control circuit 214 and the lens drive control circuit 206 are electrically connected with each other via an electrical contact point portion 213 at the mount unit 204 so as to exchange various types of information including lens information and information indicating the defocus quantity to be used to drive the focusing lens.

As explained earlier, the focus detection pixel row is built into an area of the image sensor 212 corresponding to the focus detection position. The subject image having passed through the exchangeable lens 202 and formed on the image sensor 212 undergoes photoelectric conversion at the image sensor 212, and the output resulting from the photoelectric conversion is provided to the body drive control circuit 214. Based upon the outputs from the focus detection pixels, the body drive control circuit 214 calculates the defocus quantity indicating the extent of defocusing at the focus detection position and provides the defocus quantity thus calculated to the lens drive control circuit 206. In addition, the body drive control circuit 214 stores the image signals generated based upon the outputs from the image capturing pixels into the memory card 219 and also provides the image signals to the liquid crystal display element drive circuit 215 for display at the liquid crystal display element 216.

The lens drive control circuit 206 adjusts the lens information in correspondence to the current focusing state, zooming state, aperture setting state or the like. More specifically, it monitors the positions of the lenses 208 and 210 and the aperture position assumed at the aperture 211, and calculates correct lens information based upon the monitored information or selects the lens information corresponding to the monitored information from a lookup table prepared in advance. The lens drive control circuit 206 calculates a lens drive quantity indicating the extent to which the lens is to be driven based upon the defocus quantity having been received and drives the focusing lens 210 to a focus match point based upon the lens drive quantity.

Figure 10:
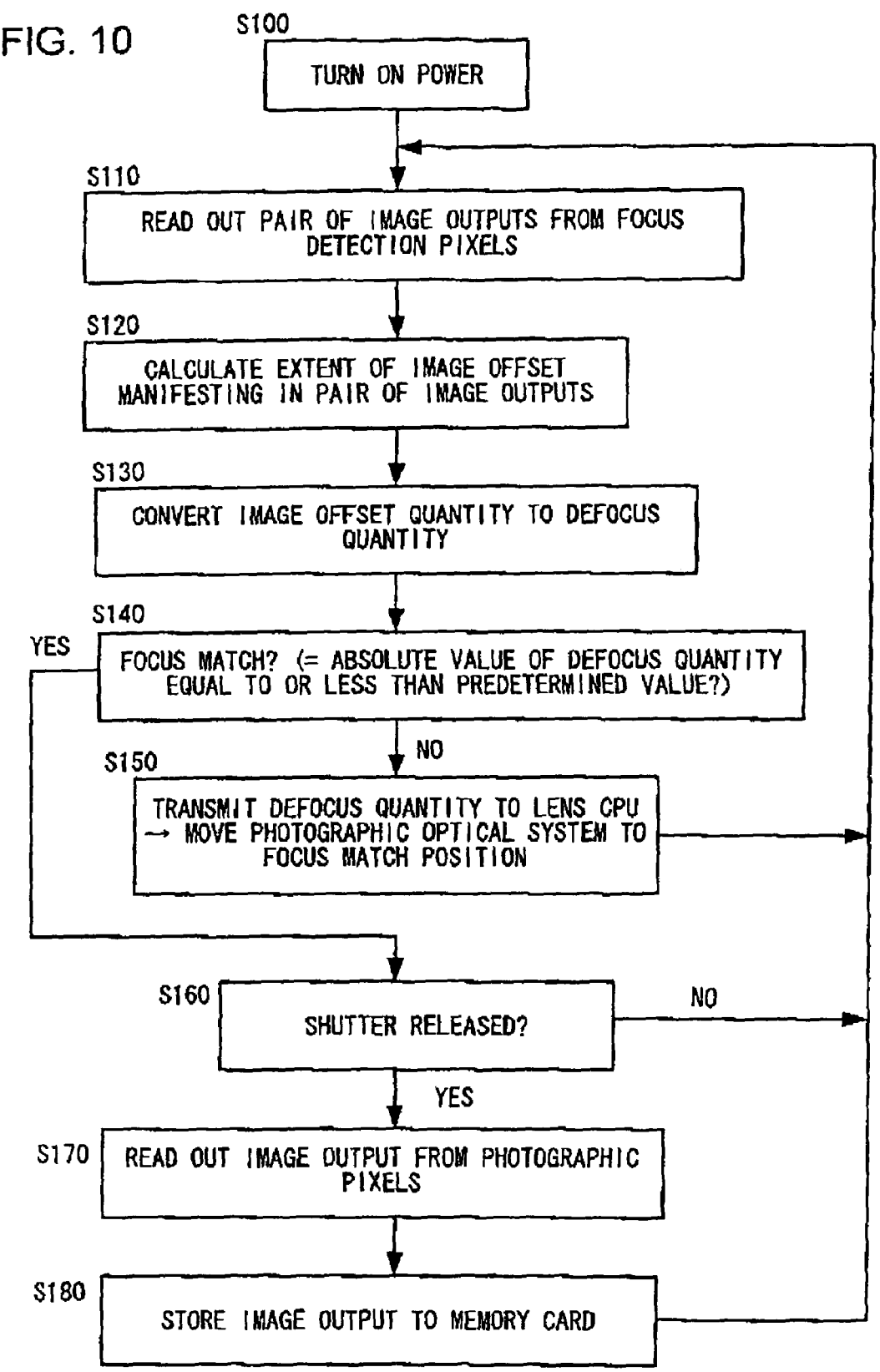
FIG. 10 presents a flowchart of the operation executed in the digital still camera (image capturing device) in FIG. 9.

FIG. 10 presents a flowchart of the operation executed in the digital still camera (image capturing device, image capturing and focus detection device) in FIG. 9. A microcomputer in the body drive control circuit 214 repeatedly executes this operation after the power to the camera is turned on. Once the power is turned on in step 100, image signals corresponding to a pair of images are read out from the focus detection pixels in step 110. In the following step 120, image offset detection arithmetic processing of the known art is executed based upon the pair of image signals to calculate the image offset quantity indicating the extent of image offset. In step 130, the image offset quantity is converted to the defocus quantity. In step 140, a decision is made as to whether or not a focus matched state is achieved with the optical system based upon the defocus quantity and the operation proceeds to step 160 if the optical system is judged to achieve the focus matched state, whereas the operation proceeds to step 150 if the optical system is not judged to achieve the focus matched state.

If it is decided that the optical system is not in the focus matched state, the defocus quantity is transmitted to the lens drive control circuit 206 and the focusing lens 210 in the optical system is driven to the focus match position in step 150 and then the operation returns to step 110 to repeatedly execute the operation described above. If, on the other hand, the optical system is judged to be in the focus matched state, a decision is made in step 160 as to whether or not a shutter release operation has been performed and if it is decided that no shutter release has occurred, the operation returns to step 110 to repeatedly execute the operation described above. If it is decided that a shutter release has occurred, the operation proceeds to step 170 to read out image signals from the image capturing pixels. In the following step 180, the image signals are stored into the memory card 219 and then the operation returns to step 110 to repeatedly execute the operation described above.

(Variations of the Layout of the Image Capturing Pixels and the Focus Detection Pixels at the Image Sensor)

Figure 11:
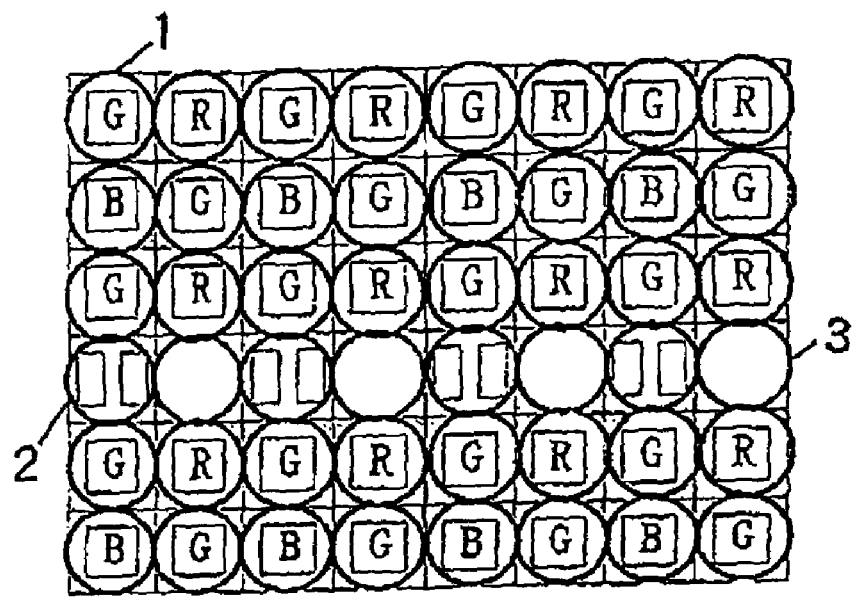
FIG. 11 presents an example of a variation of the layout for the image capturing pixels and the focus detection pixels.

FIGS. 11 to 16 present examples of variations of the layout of the image capturing pixels and the focus detection pixels. It is to be noted that these figures only show part of the image sensor over a six-pixel (vertical) by eight-pixel (horizontal) range so as to facilitate the explanation. While the image sensor in FIG. 1 includes focus detection pixels disposed at positions normally occupied by G (green) image capturing pixels, the focus detection pixels may be offset along the horizontal direction by one pixel from their positions in the layout shown in FIG. 1 so as to set the focus detection pixels at positions normally occupied by B (blue) image capturing pixels, as shown in FIG. 11.

Figure 12:
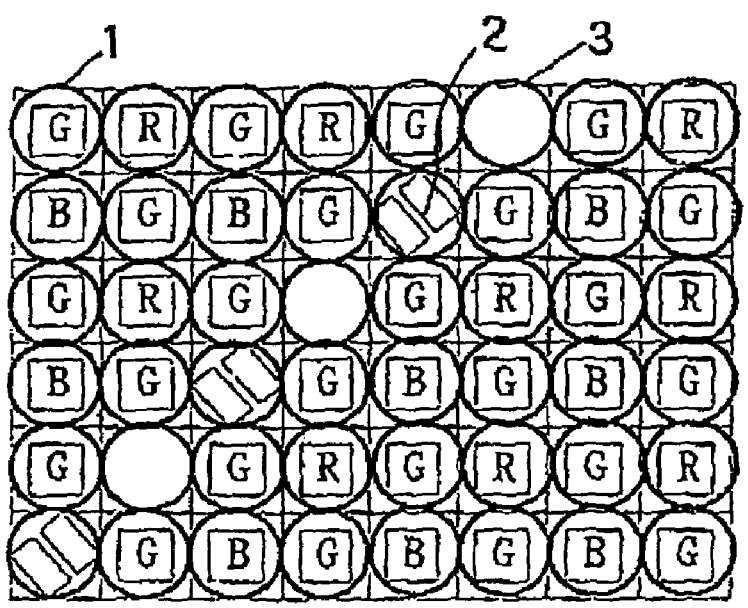
FIG. 12 presents another example of a variation of the layout of the image capturing pixels and the focus detection pixels.
Figure 13:
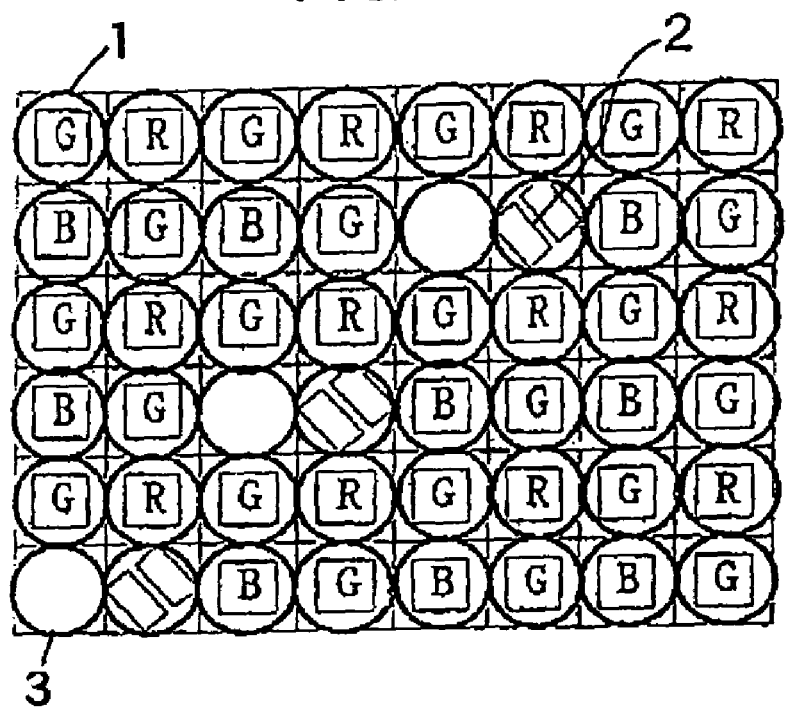
FIG. 13 presents yet another example of a variation of the layout of the image capturing pixels and the focus detection pixels.
Figure 14:
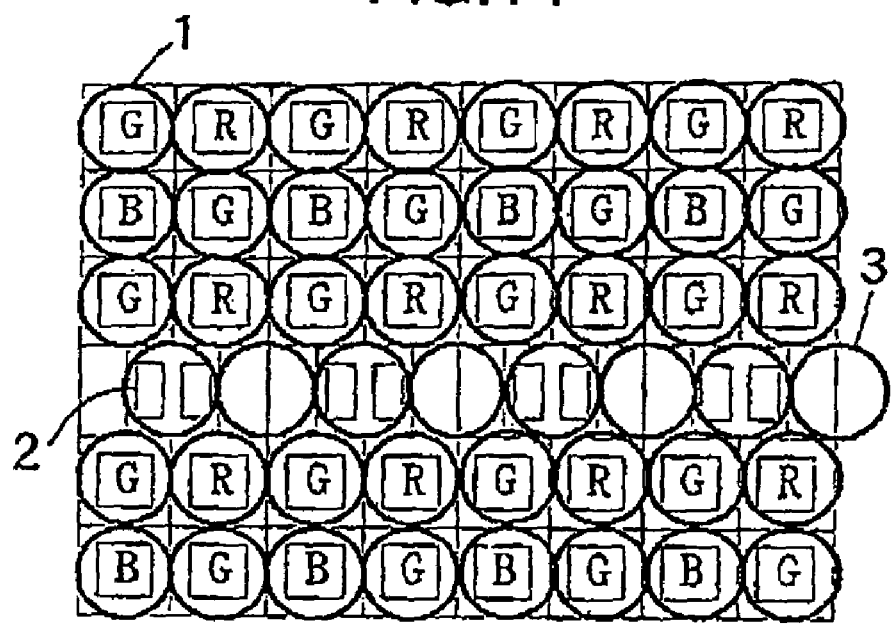
FIG. 14 presents yet another example of a variation of the layout of the image capturing pixels and the focus detection pixels.

FIG. 12 presents an example in which focus detection pixels are disposed along a diagonal direction. In this layout, dummy pixels are disposed between the focus detection pixels. FIG. 13 presents an example in which focus detection pixels are also disposed along a diagonal direction. In this layout, dummy pixels are disposed next to the focus detection pixels along the horizontal direction. FIG. 14 presents an example in which the focus detection pixels are offset each by a half pixel along the horizontal direction from their positions in the layout shown in FIG. 1.

Figure 15:
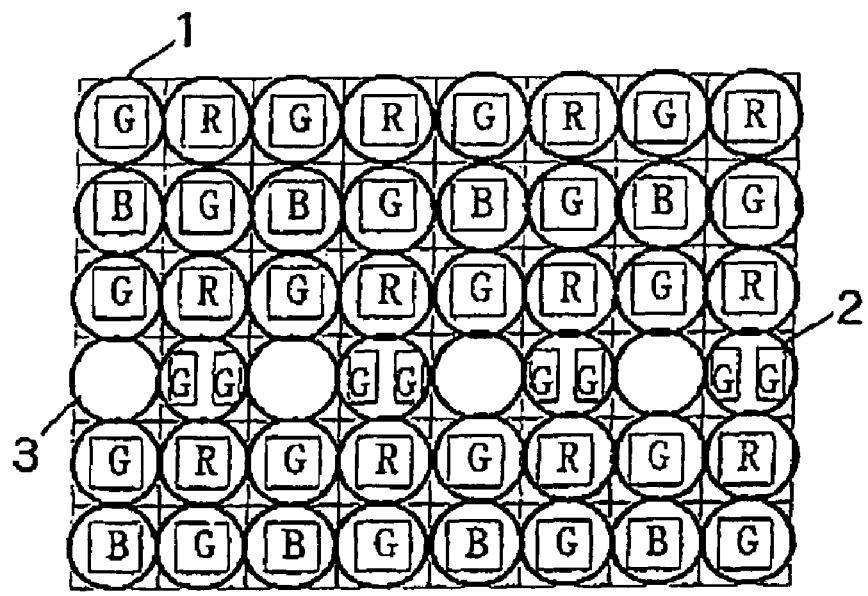
FIG. 15 presents yet another example of a variation of the layout of the image capturing pixels and the focus detection pixels.

FIG. 15 presents an example in which color filters are disposed at the focus detection pixels. Color filters are not disposed at the focus detection pixels in the image sensor shown in FIG. 1. In the layout shown in FIG. 15, color filters (G), the color of which matches that of the color filters at the image capturing pixels normally disposed at the positions assumed by the focus detection pixels are disposed at the focus detection pixels. The outputs of the pair of photoelectric conversion units at each focus detection pixel in this image sensor are combined within the image sensor or outside the image sensor, and the combined output is corrected so that the output level of the combined output becomes equal to the photoelectric conversion output level from the image capturing pixel that would normally be disposed at the corresponding position. The output level is corrected in an adjustable manner in correspondence to the area occupied by the photoelectric conversion units and the lens information (the open aperture value, the zoom position, the focusing range and the like) related to the optical system. The correction calculation is executed by the body drive control circuit 214, and the corrected focus detection pixel output is incorporated into the image signals as a substitute for the output of the image capturing pixel that would normally occupy the position assumed by the focus detection pixel. It is particularly advantageous to dispose the focus detection pixels at positions normally occupied by image capturing pixels with green (G) filters, since the outputs of the green (G) filter pixels disposed with a high level of density in the Bayer array can correct the outputs of the focus detection pixels and substitute the corrected outputs for the outputs from the image capturing pixels to be interpolated.

Figure 16:
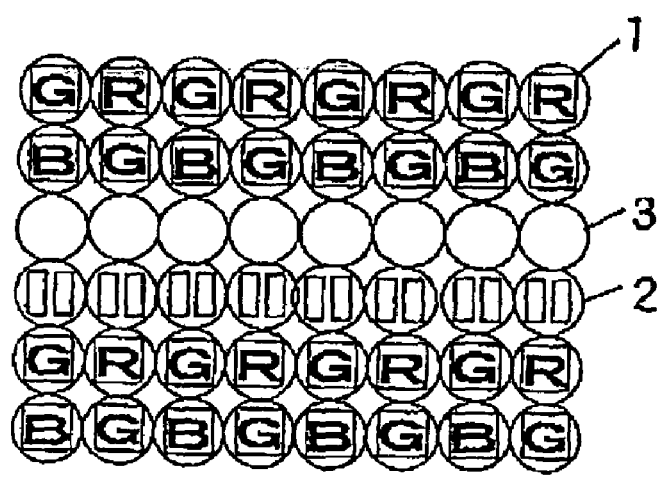
FIG. 16 presents yet another example of a variation of the layout of the image capturing pixels and the focus detection pixels.

FIG. 16 presents an example in which focus detection pixels are disposed without any gaps in between and dummy pixels are disposed adjacent to the focus detection pixels along the direction perpendicular to the direction in which the focus detection pixels are arranged next to each other. This layout, in which the focus detection pixels are disposed without gaps in between, improves the focus detection accuracy.

(Image Capturing Device)

It is to be noted that the image capturing device (image capturing and focus detection device) is not limited to the digital still camera in the embodiment described above, which comprises an exchangeable lens and a camera body. The present invention may instead be adopted in, for instance, a digital still camera with an integrated lens or a video camera. Alternatively, it may be adopted in a compact camera module built into a portable telephone or the like.

(Image Sensor)

When the outputs from the focus detection pixels in the image sensor achieved in the embodiment described above are corrected and used to generate image signals, the resolution is bound to be low since the focus detection pixels are disposed at every other position along the direction in which they are arrayed. Accordingly, an optical low pass filter should be disposed at the light entry surface of the image sensor so as to improve the image quality. Since an optical low pass filter has a function of superimposing images offset by one pixel along the direction in which the focus detection pixels are arrayed over the initial images, the presence of the optical low pass filter minimizes the extent to which the resolution of the focus detection pixels becomes lowered. In other words, since the image that is projected onto a dummy pixel is also projected onto an adjacent focus detection pixel, the extent to which the resolution of the focus detection pixels becomes lowered is minimized.

As described above, in the image sensor, which includes image capturing pixels and focus detection pixels disposed together on a single substrate, as described earlier in reference to an embodiment, pixels that are not equipped with any photoelectric conversion units (dummy pixels described above or adjacent pixels) are disposed adjacent to the focus detection pixels. As a result, the photoelectric conversion units of the focus detection pixels, the read circuits engaged in operation to read out the photoelectric conversion outputs or the like can be disposed in the space allocated for the dummy pixels (adjacent pixels), which facilitates miniaturization of the pixels.

Since the image capturing pixels and the focus detection pixels are both provided in a single size, the pixel layout, which includes the image capturing pixels and the focus detection pixels, is facilitated in the embodiment.

In the embodiment, each image capturing pixel includes a single photoelectric conversion unit, each focus detection pixel includes a pair of photoelectric conversion units and a micro-lens through which incident light is condensed onto the photoelectric conversion unit(s) is disposed at each of the image capturing pixels and the focus detection pixels, This structure allows the photoelectric conversion units for the focus detection pixels, the photoelectric conversion output read circuits and the like to be disposed in the space allocated for dummy pixels (adjacent pixels), facilitating miniaturization of the pixels. In addition, the number of the photoelectric conversion units and output read circuits does not need to increase over the number of photoelectric conversion units and read circuits in an image sensor entirely constituted with image capturing pixels equipped with a single photoelectric conversion unit. In addition, since similar output read control can be executed for the image capturing pixels and the focus detection pixels, the control can be simplified.

By adopting the embodiment in which the image capturing pixels are arrayed two-dimensionally and the focus detection pixels are arranged in a line, the output read circuits for the focus detection pixels can be disposed in a manner similar to that with which the output read circuits for the image capturing pixels are arranged and thus, the pixel layout is facilitated.

By adopting the embodiment in which the focus detection pixels and the dummy pixels (adjacent pixels) are arranged in a line, a rational pixel layout can be achieved with the photoelectric conversion units and the output read circuits of the focus detection pixels and the like disposed in the space allocated for the dummy pixels (adjacent pixels), and the pixels can be miniaturized.

By adopting the embodiment that includes an optical low pass filter for projecting the image light fluxes so as to also enter an adjacent pixel set next to the focus detection pixel, the extent to which the focus detection resolution is lowered due to the presence of the dummy pixels (adjacent pixels) next to the focus detection pixels can be minimized.

By adopting the embodiment with color filters disposed at the pixels so as to achieve a specific color array and the focus detection pixels disposed at positions corresponding to the color filters disposed with the highest level of density in the specific color array, the outputs from the color filter pixels disposed with the highest density in the color array can be interpolated with the outputs from the focus detection pixels that are corrected and used as substitutes for the output from image capturing pixels. As a result, the extent to which the resolution of the captured image becomes lowered is minimized.

By adopting the embodiment, in which a regulating member (light blocking member) for regulating the areas over which light is received at the photoelectric conversion units is disposed at each focus detection pixel and the opening at the regulating member assumes the same shape as the shape of the light receiving areas at the photoelectric conversion units of the image capturing pixels, a higher level of freedom is afforded with regard to the layout of the photoelectric conversion units and the output read circuits in the focus detection pixels and, at the same time, the outputs of the focus detection pixels can be sustained at an output level equal to that of the image capturing pixels, minimizing the extent to which the resolution of the captured image becomes lowered.

By adopting the embodiment, in which a regulating member (light blocking member) for regulating the areas over which light is received at the photoelectric conversion units is disposed at each focus detection pixel and the opening at the regulating member assumes a circular shape with an area smaller than the light receiving area at the photoelectric conversion units of the image capturing pixels, any eclipse of the focus detection light fluxes attributable to the particular photographic lenses and apertures that may be used can be prevented, which, in turn, improves the focus detection accuracy.

The image capturing device achieved in the embodiment, comprising the image sensor described above, an optical system that forms an image on the image sensor, an image capturing unit that generates an image based upon the outputs from the image capturing pixels in the image sensor and a focus detection unit that detects the state of the focus adjustment achieved via the optical system based upon the outputs from the focus detection pixels in the image sensor, is capable of capturing an image with high resolution while assuring improved focus detection accuracy.

In the embodiment, color filters corresponding to a specific color are disposed at the focus detection pixels in the image sensor and the outputs from the plurality of photoelectric conversion units at each focus detection pixel are combined at the image capturing unit so as to use the combined output as a substitute for the output from an image capturing pixel. By disposing at the focus detection pixels color filters corresponding to the predominant color component, e.g., green (G) in the Bayer array, the extent to which the resolution of the captured image becomes lowered can be minimized.

The image capturing device achieved in the embodiment comprises an image sensor that includes two-dimensionally arrayed image capturing pixels each equipped with a color filter and a photoelectric conversion unit, and focus detection pixels, each equipped with a color filter corresponding to a specific color component and a pair of photoelectric conversion units that are disposed in part of the pixel array, an optical system that forms an image on the image sensor, a combining unit that combines the outputs of the pair of photoelectric conversion units at each focus detection pixel, a correction unit that corrects the output from the combining unit so that the output level of the output from the combining unit is equalized to the output level of a hypothetical image capturing pixel with a color filter corresponding to the specific color component hypothetically occupying the position actually assumed by the focus detection pixel, an image capturing unit that generates an image based upon the outputs from the image capturing pixels and the outputs from the focus detection pixels having been corrected by the correction unit, and a focus detection unit that detects the state of the focus adjustment achieved with the optical system based upon the outputs from the focus detection pixels. By disposing color filters corresponding to a specific color, which are disposed with the highest level of density in the pixel array, e.g., green (G) color filters in the Bayer array, at the focus detection pixels, an image with a high level of resolution can be captured while assuring improved focus detection accuracy.

The above described embodiments are examples and various modifications can be made without departing from the spirit and scope of the invention.

What is claimed is:

1. An image sensor, comprising:
   image capturing pixels and focus detection pixels disposed together on a single substrate; and
   adjacent pixels that are not equipped with a photoelectric conversion unit, wherein:
   each of the adjacent pixels is disposed adjacent to each of the focus detection pixels;
   each of the image capturing pixels includes a single photoelectric conversion unit; and
   each of the focus detection pixels includes a pair of photoelectric conversion units.

2. An image sensor according to claim 1, further comprising:
   a read circuit that reads out one of the pair of photoelectric conversion units of each of the focus detection pixels and is disposed at one of the adjacent pixels adjacent to each of the focus detection pixels.

3. An image sensor according to claim 1, wherein:
   each of the image capturing pixels including the single photoelectric conversion unit and each of the focus detection pixels including the pair of photoelectric conversion units assume sizes equal to each other.

4. An image sensor according to claim 1, wherein:
   a micro-lens through which incident light is condensed onto the photoelectric conversion unit(s) is disposed at each of the image capturing pixels and the focus detection pixels.

5. An image sensor according to claim 1, wherein:
   the image capturing pixels are arrayed two-dimensionally; and
   the focus detection pixels are arrayed in a line.

6. An image sensor according to claim 5, wherein:
   the focus detection pixels and the adjacent pixels are arrayed in a line.

7. An image sensor according to claim 6, further comprising:
   an optical low pass filter disposed so as to project image light fluxes in double along a direction in which the focus detection pixels and the adjacent pixels are arrayed.

8. An image sensor according to claim 1, further comprising:
   color filters that are disposed at the pixels so as to achieve a specific color array, wherein:
   the focus detection pixels are disposed at positions corresponding to color filters set with a highest density in the specific color array.

9. An image sensor according to claim 1, wherein:
   the focus detection pixels each include a regulating member for regulating an area over which light is received at a photoelectric conversion unit thereof and an opening at the regulating member assumes a same shape as a shape of a light receiving area at a photoelectric conversion unit in each of the image capturing pixels.

10. An image sensor according to claim 1, wherein:
    the focus detection pixels each include a regulating member for regulating an area over which light is received at a photoelectric conversion unit thereof and an opening at the regulating member assumes a circular shape with an area smaller than a light receiving area at a photoelectric conversion unit in each of the image capturing pixels.

11. An image sensor according to claim 1, wherein:
    one of the pair of photoelectric conversion units of each of the focus detection pixels is read out at timing of reading out a position of an adjacent pixel adjacent to each of the focus detection pixels.

12. An image sensor, comprising:
    first pixels that capture an image;
    second pixels that detect focus condition of an optical system, the first pixels and the second pixels being disposed together on a single substrate; and
    third pixels each of which is disposed adjacent to each of the second pixels without a photoelectric conversion unit, wherein:
    each of the first pixels comprises a first photoelectric conversion unit that converts a light from the optical system into an electrical signal; and
    each of the second pixels comprises a pair of second photoelectric conversion units each of which converts the light from the optical system into an electric signal.

* * * * *

UNITED STATES PATENT AND TRADEMARK OFFICE
CERTIFICATE OF CORRECTION

| | | |
|---|---|---|
| PATENT NO. | : 7,715,703 B2 | |
| APPLICATION NO. | : 11/645663 | |
| DATED | : May 11, 2010 | |
| INVENTOR(S) | : Utagawa et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 634 days.

Signed and Sealed this
Eighteenth Day of January, 2011

David J. Kappos
*Director of the United States Patent and Trademark Office*